Patented Sept. 24, 1940

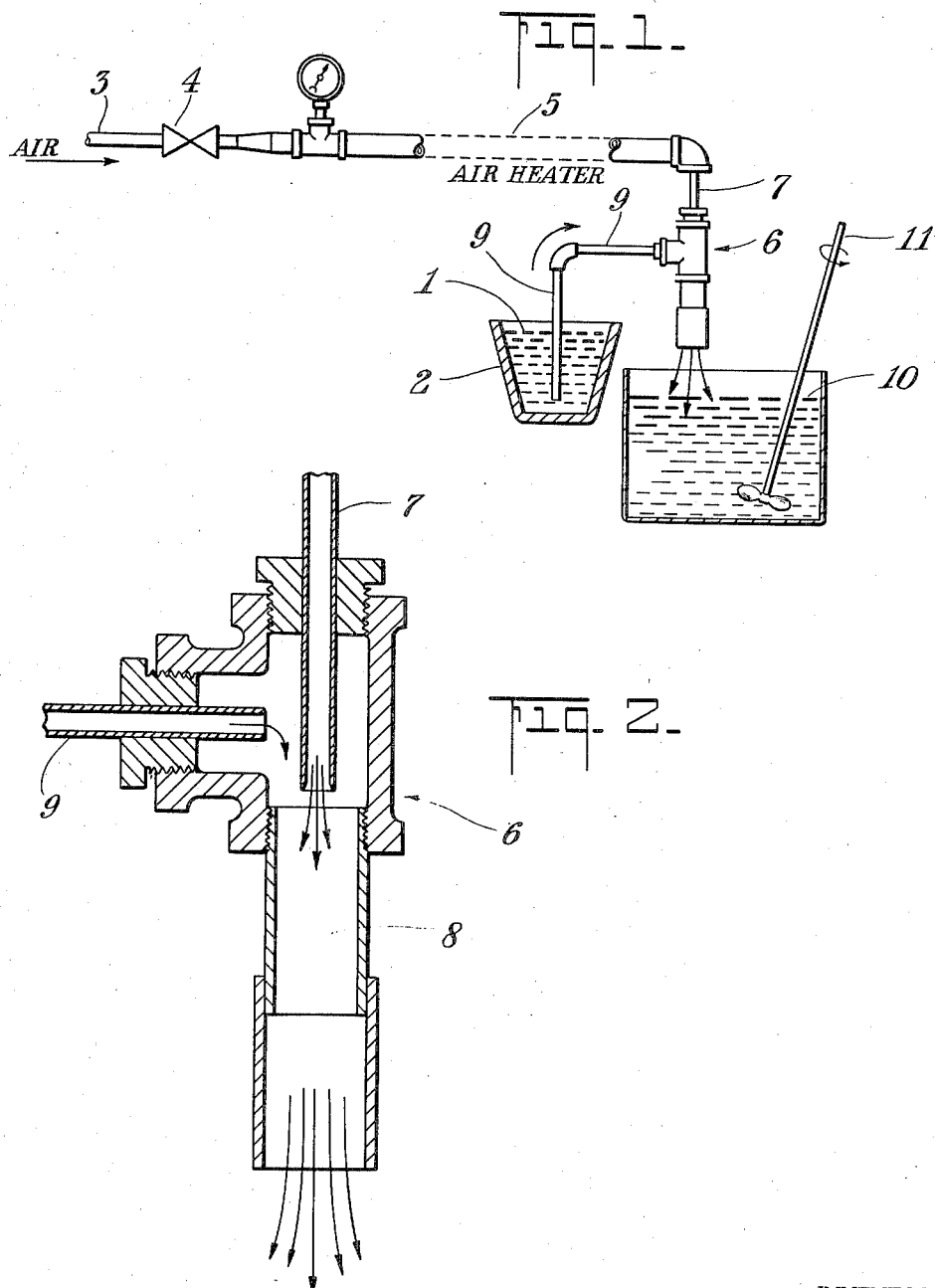

2,215,866

UNITED STATES PATENT OFFICE 2,215,866

MANUFACTURE OF PURIFIED PIGMENTARY ALKALINE EARTH METAL SULPHATES

Hugh V. Alessandroni, New York, N. Y., assignor to National Lead Company, New York, N. Y., a corporation of New Jersey Application August 17, 1938, Serial No. 225,394

7 Claims. (Cl. 23—122)

This invention relates to the manufacture of purified pigmentary alkaline earth metal sulphates such as calcium and barium sulphate and has for its object, among others, a method for controlling the particle size and uniformity of particle size distribution of such sulphates.

My present invention pertains to that method of preparing alkaline earth metal sulphates known as the "salt fusion method." In this method crude natural alkaline earth metal sulphate, for example barytes or natural anhydrite is dissolved in a molten salt which acts as a solvent for the natural sulphate. Among the useful solvent salts sodium chloride is preeminently suitable. When the crude natural sulphate has been dissolved in the molten salt, the impurities, which are largely of a metallic nature, settle out in the form of a slag or gangue and the sodium chloride-natural sulphate solution is then poured into water, which operation is termed "quenching." The solvent salt, for example the sodium chloride, is dissolved in the quenching liquor and the purified alkaline metal sulphate is precipitated out. One such salt fusion method is described in U. S. Patent No. 2,039,432. In the practice of my invention I may start with a solvent salt-crude metal sulphate melt prepared by any of the known methods of the prior art.

The quenching operation in the prior art, however, included no means for controlling the particle size and the particle size distribution of the purified alkaline metal sulphate obtained after the quenching operation. Some suggestions along these lines appear in the prior art; for instance, it is suggested that by regulating the flow of melt into the quenching medium in a fairly thin stream, an extremely fine product is obtained. Furthermore, it has been suggested that the melt be allowed to flow into the quenching medium through orifices not exceeding 2 centimeters in diameter, thus to produce purified alkaline earth metal sulphate which is stated to be apparently amorphous and containing 50 percent of the particles thereof of a size less than 0.75 micron, 70 percent less than 1.5 microns, 85 percent smaller than 3 microns and only 15 percent larger than 3 microns. It will be seen that these suggestions all entail the introduction of the melt into the quenching liquor at substantially normal conditions of pressure.

I now have found that if the purified melt of alkaline earth metal sulphate and solvent salt be injected into the quenching liquor through an injecting nozzle producing a spray effect under pressure conditions above atmospheric or normal the particle size of the resultant alkaline earth metal sulphate may be controlled to produce a product possessing greater uniformity of particle size distribution and greater fineness of average particle size than was heretofore obtainable by any of the known methods of the prior art.

In the accompanying drawing, Fig. 1 represents one embodiment of my invention and depicts a system whereby the molten alkaline earth metal sulphate-solvent salt melt may be sprayed into the quenching liquor in accordance with my invention.

Fig. 2 represents a cross-section view of a suitable type of spraying ejector which may be employed in the practice of my invention.

In the operation of my invention the purified alkaline earth metal sulphate-solvent salt melt 1 obtained from any suitable prior art salt fusion method, for instance, the process of U. S. Patent No. 2,039,432, is placed in any suitable open receptacle 2, it being understood that external heat may be applied to the kettle to prevent the melt from solidifying. Compressed air is introduced into the system through the pipe 3, regulated by means of the throttle 4. The air is then preheated as it passes along the pipe 5 on its way to the spray head or injector 6. The object of the preheating is to prevent the cool air from solidifying the melt in the spray head. The passage of air through the restricted pipe 7 into the expansion chamber 8 creates a partial vacuum in that chamber which sucks the fluid alkaline earth metal sulphate-solvent salt melt up through the pipe 9 into the expansion chamber of the spray head. As the fluid melt emerges into the expansion chamber 8 of the spray head 6, it mixes with the air emerging through the restricted pipe 7. As the air-melt mixture reaches the lower or ejection end of the spray head it is churned or beaten by the action of the air into a fine spray. Thus, in the form of a spray it enters the quenching liquor 10 which may be agitated by a suitable means, e. g., mechanical agitation 11.

It is obvious that by increasing the pressure under which the air is forced through the restricted pipe 7, the finer will be the spray entering the quenching liquor 10 and the finer will be the particle size of the purified alkaline earth metal sulphate obtained thereby.

An air pressure of between about 20 to 35 pounds per square inch has been found to be a very convenient range in which to operate the present invention. One example under operating these pressures is as follows:

Two hundred grams of ground natural barytes were melted with equal quantity of sodium chloride at 900° C. The impurities settled to the bottom of the heated kettle. The fluid melt of barytes and sodium chloride was ejected in a system as shown in Fig. 1 into 10 liters of water, taking two minutes to complete the ejection. The air introduced into the system was preheated to about 650° C. and the pressure thereof maintained within the range of about 20 to 60

35 pounds per square inch. The barium sulphate precipitated in the quenching liquor was washed with 2 liters of water. After a simple milling treatment to break down any loosely agglomerated aggregates, the barium sulphate particles so produced had an average particle size diameter, as determined by microscopic analysis, of about 0.47 microns. The particle size distribution was as follows: about 68 percent averaged between 0.2 and 0.4 micron, about 20 percent between 0.4 and 1.0 micron in diameter with about 10 percent having an average particle size diameter of more than 1.0 micron with no particles exceeding 3.5 microns in size.

By way of contrast, a similar fluid melt of barytes and sodium chloride was simply poured into the quenching liquor. The resulting barium sulphate had an average particle size of 0.81 micron with a particle size distribution of only about 20 percent between 0.2 and 0.4 micron, and with 50 percent between 0.4 and 1.0 micron, 30 percent having a diameter of between 1 and 5 microns.

In addition to the improved uniformity and decidedly smaller average particle size which is obtained by the practice of my invention, the practical operation is improved in that the ejection of the molten alkaline earth metal sulphate-solvent melt is very quiet and may be conducted quite rapidly. In distinction to this, the prior art quenching is very violent with evolution of clouds of steam and splashes of boiling water and still molten melt endangering the operators. The rapidity of the quenching, of course, is limited by this violent reaction.

My invention embraces an additional feature heretofore not suggested in prior art methods. I have found that if an inorganic salt which acts as a dispersing agent for the alkaline earth metal sulphate be added in small quantities to the fluid melt prior to ejection into the quenching medium, there will be produced a somewhat more uniform product. It appears that by adding the dispersing agent to the quenching liquor it acts more effectively on the alkaline earth sulphate when the fluid melt is quenched. Salts which I have found to be effective as dispersing agents include those which have a common ion with the alkaline earth metal sulphate. Thus, barium chloride added to the fluid melt will effectively disperse the barium sulphate, as will calcium chloride when added to a calcium sulphate-sodium chloride melt.

I have further found that if a protective colloid be added to the quenching liquor there results an improvement in the uniformity of the ultimately produced alkaline earth metal sulphate. The protective colloid may be either of organic or inorganic nature, for example glue, agar-agar, proteins, albuminoids, and the like compounds which are effective in this connection, as are also the known inorganic protective colloids.

The foregoing description of my invention has been given for clearness of understanding and no undue limitations should be deduced therefrom, but the appended claims should be construed as broadly as possible in view of the prior art.

I claim:

1. In a salt-fusion method for obtaining purified alkaline-earth metal sulphates, which includes dissolving a crude natural alkaline-earth metal sulphate in a solvent molten salt, the step which consists in aspirating under a pressure greater than atmospheric the purified alkaline-earth metal sulphate-solvent salt melt, and injecting the same in the form of a spray into a quenching liquid.

2. In a salt-fusion method for obtaining purified alkaline-earth metal sulphates, which includes dissolving a crude natural alkaline-earth metal sulphate in a solvent molten salt, the step which consists in aspirating by means of a current of gas under a pressure of between about 20 and about 35 pounds per square inch, the purified alkaline-earth metal sulphate-solvent salt melt, and injecting the same in the form of a spray into a quenching liquid.

3. In a salt-fusion method for obtaining purified alkaline-earth metal sulphates, which includes dissolving a crude natural alkaline-earth metal sulphate in a solvent molten salt, the steps which consist in adding to the fluid melt of alkaline-earth metal sulphate and solvent salt a small amount of a dispersing agent for the alkaline-earth metal sulphate and aspirating under a pressure greater than atmospheric the purified melt and injecting the same in the form of a spray into a quenching liquid.

4. In a salt-fusion method for obtaining purified alkaline-earth metal sulphates, which includes dissolving a crude natural alkaline-earth metal sulphate in a solvent molten salt, the steps which consist in adding to the fluid melt of alkaline-earth metal sulphate and solvent salt a small amount of a dispersing agent having an ion in common with the said alkaline-earth metal sulphate, and aspirating under a pressure greater than atmospheric the purified melt and injecting the same in the form of a spray into a quenching liquid.

5. In a salt-fusion method for obtaining purified alkaline-earth metal sulphates, which includes dissolving a crude natural alkaline-earth metal sulphate in a solvent molten salt, the step which consists in aspirating under a pressure greater than atmospheric the purified alkaline-earth metal sulphate-solvent salt melt, and injecting the same in the form of a spray into a quenching liquid, to which has been added a protective colloid.

6. In a salt-fusion method for obtaining purified alkaline-earth metal sulphates, which includes dissolving a crude natural alkaline-earth metal sulphate in a solvent molten salt, the step which consists in aspirating under a pressure greater than atmospheric the purified alkaline-earth metal sulphate-solvent salt melt, and injecting the same in the form of a spray into a quenching liquid selected from the group consisting of aqueous solutions of glue, agar-agar, proteins and albuminoids.

7. In a salt-fusion method for obtaining purified alkaline-earth metal sulphates, which includes dissolving a crude natural alkaline-earth metal sulphate in a solvent molten salt, the step which consists in aspirating under a pressure greater than atmospheric the purified alkaline-earth metal sulphate-solvent salt melt and injecting the same in the form of a spray into a quenching liquid to which has been added an inorganic dispersant having an ion in common with said alkaline-earth metal sulphate.

HUGH V. ALESSANDRONI.